United States Patent [19]

Monagle et al.

[11] Patent Number: 4,518,620
[45] Date of Patent: May 21, 1985

[54] PROCESS FOR BREADING FOOD

[75] Inventors: Charles W. Monagle; Janet C. Smith, both of Fort Wayne, Ind.

[73] Assignee: Central Soya Company, Inc., Fort Wayne, Ind.

[21] Appl. No.: 526,690

[22] Filed: Aug. 26, 1983

[51] Int. Cl.³ .............................................. A23L 1/176
[52] U.S. Cl. .................................... 426/291; 426/293; 426/296; 426/303; 426/289
[58] Field of Search ............... 426/289, 291, 292, 293, 426/296, 302, 303–305, 310, 555, 652, 576, 578, 602

[56] References Cited

U.S. PATENT DOCUMENTS 4,199,603  4/1980  Sortwell .............................. 426/92

FOREIGN PATENT DOCUMENTS 53-66448  6/1978  Japan .................................... 426/92

*Primary Examiner*—Raymond Jones
*Assistant Examiner*—Elizabeth A. King
*Attorney, Agent, or Firm*—Tilton, Fallon, Lungmus & Chestnut

[57] ABSTRACT

This invention is concerned with a novel process for preparing breaded foods which, when baked, have the desirable characteristics of the deep-fat fried counterpart which is made possible by coating with a fat-emulsion, breading and thereafter overcoating with an egg white solution.

17 Claims, No Drawings

PROCESS FOR BREADING FOOD

INTRODUCTION

Breaded foods have been a part of the Western food culture for many years. These have been primarily meats and seafoods, but other foods such as vegetables and fruits have been served in breaded form. More recently mushrooms and cheeses have been added to this list.

Breaded foods are customarily made by first batter coating the comestible and then applying a coat of breading. The wet batter serves as a means for making the breading adhere to the food item. In home use, batters are often composed of flour, milk, hand-homogenized whole fresh eggs, seasoning, and the like. For industrial use, batter mixes to be reconstituted with water may contain a variety of ingredients including flour, special starches, non-fat dry milk and milk derivatives, egg products, gums, flavoring agents, and coloring agents, among others. The breading is usually composed of crumbs of dried or toasted bread, crackers, and/or cereal particulates.

For industrial use, i.e., food-service and retail, (foods for restaurants, institutions, and fast food establishments), breadings are made in large volume, and are provided as an ingredient for further processing into value-added breaded foods, or offered as-is for the retail consumer. These breadings may be sized, spiced, flavored, or colored to meet a designated need.

Before serving, breaded foods are deep-fat or shallow-fat fried producing a food with an appealing golden color and a desirable crisp, crunchy mouth reaction. In the industrial sector, the breaded foods may be frozen in the raw state and then fried prior to serving, or they may be flash or partially fried prior to freezing. Some products are fully fried and frozen requiring reheating for serving.

BACKGROUND OF THE INVENTION

In recent years, there has been an increasing concern about health-oriented values of deep-fat fried foods. Such concerns have been voiced in both the popular and scientific press. Yet, breaded foods enjoy wide consumer appeal because of their color and crisp appearance, and their crisp, crunchy texture evident on eating, viz., mouth-feel.

It is also recognized that many consumers perceive baked foods to be more healthful than fried foods. In response to this recognition, certain food manufacturers have devoted effort to provide various breaded foods which can be prepared in the oven for serving. These breaded foods include food-service and retail items. They are uncooked, partially cooked, or fully cooked prior to quick freezing. This class of food items is prepared with traditional batter-breading systems employed in making products for deep-fat frying with a change in directions for preparation for serving to accommodate oven reconstitution.

In addition, a search of the prior art indicates that considerable effort has been spent in developing complete breading mixes for the preparation of coated oven-baked foods. These mixes are intended mostly for home use. In the prior art, as recited in the patent literature, much is made of the ability to achieve baked breaded foods whose characteristics simulate those achieved by deep-fat frying.

This prior art is summarized in the following U.S. Pat. Nos.: 3,586,512; 3,843,827; 3,852,501; 4,068,009; 4,199,603; 4,208,442; 4,218,485; and 4,260,637. In a U.K. patent application, GB 2,091,532A, an aerated batter containing solid, plastic, or liquid shortenings is described.

The attractive characteristics of deep-fat fried foods include appearance values such as uniform golden or golden-brown color, uniformity of breading coverage, and an appearance of crispness (in contrast to wetness and sogginess). Also, physical characteristics such as breading coat adherence to the core food (lack of flakiness on handling), cohesiveness of the coating, and a complete coating are expected. In addition, the crispy, crunchy character of the food coating when eaten is obviously important for maximum consumer appeal. It is necessary that breaded foods designed for oven baking achieve these characteristics in order to satisfy consumer desires.

Breaded food-service and retail items, designed for oven baking but not home preparations, require other attributes or characteristics in addition to those listed above. The breaded food coating must have sufficient strength and integrity including adhesion to the core food and uniform cohesion whether the product is in the raw, partially cooked, or cooked state to withstand the normal rigors of volume line production, freezing, packaging, storage, transporation, handling, etc.

Our examination has revealed to us that breaded food products made according to the prior art for oven preparation lack one or more of the attributes or characteristics cited above, and which are required to achieve the qualities necessary for effective and efficient production and purveying, and to achieve sound consumer acceptance of an ovenable breaded food. Thus there exists a need for an innovative resolution of this food industry problem.

SUMMARY OF INVENTION

We have discovered that the use of a novel batter system, together with a particular liquid overcoating of the breading, leads to a surprising result in the properties of the breaded food item intended for oven baking. We have discovered that coating the comestible or core food with a batter that is a fat emulsion wherein an emulsion stabilizer is dissolved in the aqueous phase, then breading, followed by dipping or coating the breaded item in a solution of egg white in water and freezing produces a product which has exceptional breading integrity to withstand the mechanical abuse normal in getting such a product to market, and, further, when baked has the desirable characteristics associated with a deep-fat fried food. The steps of battering and breading may be repeated a second time prior to coating to enhance the amount of breading pick-up.

The fat emulsion is made by vigorously mixing or combining a fat which is liquid at room temperature with an aqueous solution of an emulsion stabilizer, e.g., proteinaceous and starchy substances—as described below. The emulsion has good stability for recirculation in a commercial batter applicator, fitted with suitable equipment for recirculation of the liquid with maintenance of the emulsion. The breading is applied in the conventional manner. The novel system described herein is useful with most types of breading. Prior to freezing, the egg white solution can be applied by a conventional batter machine.

The breaded food product made according to the novel system described above has unusual properties which make it ideal for the food-service and retail food industries. This system results in a food wherein, in the raw state, the breading coating has excellent adhesion, maintaining a uniform coat through the various commercial manipulations to which it is normally subjected. The loss of coating or parts thereof is a defect common to prior art products. It is common to find frozen breaded raw foods made by prior art processes, packaged and transported, to have shed considerable breading as particulates or segments of varying size.

Further, the breaded foods of this invention, when oven baked, have all the desirable, appealing attributes of their deep-fat fried counterparts. They have a golden to golden-brown color and crisp appearance. The breading coat is continuous and appears to be "cemented" together by the egg white solution "overcoat". The coat is not crumbly when either handled or prodded with a fork, indicating excellent adhesion. Also, the breading coat is crisp and crunchy when bitten and chewed. Most often, prior art products when oven baked are crumbly rather than crisp and crunchy, many times soggy and doughy.

DETAILED DESCRIPTION OF THE INVENTION

We find that our discovery is applicable to a variety of foods. These include such items as chicken parts, meat and chicken patties, fish sticks and fillets, cheese cubes and sticks, mushroom pieces, onion rings, green pepper rings, zucchini slices and spears, cauliflower florets, and fruit pieces. These are examples of possible core food items, but the invention is not necessarily limited thereto. The foods may be at room temperature, refrigerated, or frozen prior to batter-breading and coating.

One critical segment of the discovery is the fat-emulsion batter. This batter is composed of a fat emulsified in an aqueous solution containing a proteinaceous or starchy substance as an emulsion stabilizer. We prefer edible refined fats or triglycerides which are liquid at room temperature, since fats which are solid or plastic at room temperature require elevated temperatures for use, and if their emulsions are cooled, these may become grainy and thick. The useful liquid refined edible fats or oils can be processed soybean oil, cottonseed oil, peanut oil, corn oil, sunflower oil, safflower oil, palm oil, and the like. These refined oils for food use sometimes contain anti-oxidants such as BHA (butylated hydroxyanisole) and/or TBHQ (tertiary butyl hydroquinone). These refined oils may or may not contain foam inhibitors.

Insofar as the fat emulsion composition is concerned, we have discovered that levels of liquid fat from about 30 percent to about 80 percent of the total emulsion batter weight may be used. We prefer about 60 to 70 percent. Fat levels lower than about 30 percent result in products which are dry, and do not have the familiar crisp, crunchy character of breading associated with deep-fat fried foods when oven baked.

In addition to water, an emulsion stabilizer is an advantageous constituent of the aforesaid fat emulsion. We have discovered that proteinaceous and starchy substances are eminently useful in this regard. Not only do they serve to stabilize the fat emulsion, they solidify when the breaded comestible is baked, adding to the integrity and adhesion of the breading coating. The accompanying Table A contains an illustrative listing of such substances, together with their level of use in forming and maintaining the emulsion.

TABLE A

| Product | Level of Use %* |
|---|---|
| Egg white solids | 1.0–10.0 |
| Undenatured whey protein concentrate (50% protein) | 2.0–10.0 |
| Undenatured lactalbumin | 1.0–10.0 |
| Vital wheat gluten | 3.0–12.0 |
| Wheat protein concentrate (35% protein) | 4.0–15.0 |
| Pregelatinized starches | 0.5–5.0 |

*Percent based upon total weight of the emulsion.

Our preferred embodiment is egg white solids. The egg white solids may be spray dried, or may be egg white in the fresh, refrigerated, or frozen states. In the latter instance, the water content must be included as part of the total water of the emulsion. Obviously potable water is employed in preparation of the fat emulsion.

The fat emulsion can be prepared in any suitable mixing device which disperses the liquid fat in the aqueous medium as fine globules or droplets. On a small scale, these emulsions can be prepared with a kitchen-type mixer. We have observed on a pilot plant scale that emulsions containing less than about 50–60 percent liquid fat by weight of total emulsion are readily prepared using a homogenizer, and may be recirculated in the batter applicator using a properly sized centrifugal pump. Emulsions containing more than the stipulated level of fat can be prepared by mixing the ingredients in a tank using a turbine-type agitator. At these levels of fat, it is best to use a positive displacement pump for recirculation. Vigorous shearing action, such as created by a centrifugal pump may result in an inversion of the emulsion to a water-in-oil one with consequent change in the emulsion to a thick unmanageable mass.

Attempts to aerate these emulsion batters, as in the U.K. patent application cited above, revealed that the initial aerated batters were readily de-aerated through mechanical and frictional shear, such as occurs in volume processing lines. Thus this prior art has no bearing upon the novelty of our discovery.

The fat-emulsion batter can be applied to the food item with any commercial type of batter applicator fitted with the proper pump for recirculation of the emulsion batter. For pilot plant work we have used a STEIN batter applicator (Stein Associates, Sandusky, Ohio, Model S-2). Also, tempura batter applicators may be used. These are designed for more viscous batters.

The system of batter-breading of this invention is useful with most conventional types of breading. These are customarily produced from various cereal grain products as described above. The breadings may be colored, flavored, seasoned, and sized as to particle shape and size. We prefer, but are not limited to, the so-called Japanese-style of breading (see U.S. Pat. No. 4,068,009). This augments the crisp-crunchy character inherent in the food items prepared according to the described process. We also prefer a breading that has been uniformly pre-browned by some toasting. This results in a more golden-brown color on baking, if such is desired.

The breading may be applied with any commercial-type unit designed for the purpose. In pilot plant work we have used a STEIN unit, Model S-2. It should be understood that the breading and particular equipment for batter and breading applications described above are not a part of this invention, and are stated herein solely for illustrative purposes.

Another important aspect of this unique breading system is the final egg white dip or coating applied over the breading. Although egg white is but one of a number of heat coagulable proteins, we have discovered that it is unique in producing, in conjunction with the fat emulsion batter, the effect of our discovery as described herein. The egg white dip is actually a solution of egg white in water. The egg white useful in this invention may be egg white in the fresh, refrigerated, or frozen states, or it may be spray-dried egg white, sometimes referred to as egg albumen. The aqueous solution contains about 5 to 15 percent of egg white solids. We prefer a solution of 10 percent solids.

The egg white solution or "overcoat" may be applied in a conventional batter applicator. However, any spraying or misting device may be used. It is important that the breaded food receive a uniform and complete coat with the protein solution.

The weight of the coating, composed of fat-emulsion, breading proper, and overcoating, is about 25 to about 40 percent of the total weight. This is for a one pass through operation. If the comestible is submitted to a second pass of batter and breading prior to the egg white dip, the weight is about 50 to about 65 percent of total weight. For the food-service and retail markets, the breaded products of this invention are usually quick frozen prior to packaging, frozen storage, transportation, etc.

The products of this invention can be prepared for serving by baking in any type of hot-air oven of the convection or forced convection types, indirectly heated by either gas or electricity. We prefer forced convection ovens. Obviously the temperature and time of baking are variables dependent upon the size, shape, moisture content, and initial temperature of the breaded food item. Various types of pans and sheets can serve to hold the food item for baking. At the higher levels of fat in the emulsion batter, as recited above, no pan lubricant is required. At the lower levels some lubricant is useful.

Although hot air ovens, particularly the forced convection types, are preferred, we have found that the products of this invention can be prepared for serving by heating in a microwave oven. In order to achieve the appearance, texture, and taste associated with fried foods, it is generally necessary to cook the products in a microwave baking accessory such as the Browning Skillet or the Pizza Crisper which are Corning Ware ® products (Marketed by Amana Refrigeration, Inc., Amana, Iowa, 52203) and to turn the products during cooking.

Breaded products prepared by this invention have been compared with those prepared by certain prior art processes, and with deep-fat fried products. These comparisons have been made by a group of panelists selected for their skill in discerning differences in product characteristics and properties. These skills were developed by repetitive training sessions wherein various cooked breaded products were presented in blind fashion for judgment.

The properties which define the characteristics of baked breaded foods are those of appearance, physicomechanical values, and eating qualities. The desirable products appear golden or golden-brown, have a uniform coating of breading with no bare spots, and appear crisp with no wet or fatty surface areas. The products of this invention have, in addition, an appealing sheen or dull gloss. The physicomechanical values are primarily ones of adhesion and cohesion which are discernable during preparation of the breaded foods for serving, and in handling or prodding as with a fork. The products of this invention have a strong breading integrity developed through excellent adhesion and cohesion. Actually, the breading seems to be a continuum established by the egg white dip.

The eating qualities of the products of this invention are like those of a deep-fat fried food; crisp, crunchy, juicy, but not soggy or doughy.

Illustration of the specific aspects of this invention and the practice thereof are presented in the following examples. These examples are not to be construed as limiting.

EXAMPLE I

Most of the following examples were carried out using the batter, dipping solution, and the bread crumb described below.

Frozen chicken nuggets, to be coated and oven cooked, were prepared by cutting chicken breast strips ($\frac{1}{4}$ inch thick, skin removed) into approximately 1-$\frac{1}{2}$ inch squares, and then individually quick freezing (IQF) the pieces in a blast freezer ($-20°$ F.).

A batter was prepared having a composition of 70 percent by weight vegetable oil, 27 percent by weight water, and 3 percent spray dried egg whites. The vegetable oil was Crisco ® Oil, a product of the Proctor and Gamble Company, Cincinnati, OH, 45202. The spray dried egg whites were obtained from Kraft, Inc., Memphis, Tenn., 38101 (Blue Label, Product No. 9592). The batter was prepared by first dissolving the dried egg white in the water, then combining the solution with the vegetable oil. The combined batter ingredients were mixed for thirty seconds at low speed with an electric kitchen mixer (General Electric, Inc., Bridgeport, Conn., Cat. No. D2M24), then at whipping (high) speed for thirty seconds.

The batter-coated chicken pieces were rolled and pressed into a seasoned Japanese-style bread crumb which had been pre-toasted to uniform brownness (Newly Weds Foods, Inc., Chicago, Ill., Product No. 6005), until completely covered. One half of the batter-breaded chicken nuggets were given a second coat of batter and breading by first immersing them in the batter, then rolling and pressing them into the breading again.

All battered and breaded chicken nuggets were then immersed momentarily in an egg white dip solution made by dissolving ten parts spray dried egg whites in ninety parts water by weight for a 10 percent solution. Excess dip was allowed to drain off, and the coated nuggets were individually quick frozen, then packed in plastic bags, and placed in frozen storage. Nuggets coated with a single pass of batter and breading were found to have about 42 percent of coating (percent of total coated product). Nuggets coated with two passes of batter and breading were found to have about 60 percent of coating.

After twenty-four hours of frozen storage, the chicken nuggets were oven cooked by placing them on a 10×15 inch baking pan, then placing the pan in an oven preheated to 450° F. The nuggets were baked for ten minutes, then turned over and baked for an additional ten minutes.

The resultant baked, coated chicken nuggets were judged by the panel of experts described previously, to have the taste, texture, and appearance of deep fried foods. They were found to have a very crisp, uniform, continuous, and cohesive coating which remained crisp for several hours. The chicken of the coated pieces was found to be moist and tender. It was noted that products with either a single or double coating of batter and breading had the taste, texture, and appearance of deep fried foods.

EXAMPLE II

The method of the present invention and the results which can be obtained thereby were compared to a prior art example, specifically Example I of U.S. Pat. No. 4,260,637, in which pieces of a cut-up chicken were coated and oven cooked.

The bread crumb composition and coated chicken pieces were prepared and oven cooked as taught in the '637 patent (Table B):

TABLE B

|  | Grams | % By Weight of the Bread Crumb Composition |
| --- | --- | --- |
| Bread crumbs | 146 | 74.0 |
| Protein blend (a) 50% by weight sodium caseinate (b) 50% by weight egg white solids | 20 | 10.0 |
| Seasoning blend (a) salt (b) dextrose (c) onion (d) garlic | 22 | 11.0 |
| Vegetable oil | 10 | 5.0 |

The bread crumbs (essentially the same as those described in Example I of the present invention) consisted essentially of wheat flour, yeast and salt, had an elongated, striated shape, porous structure, and had been toasted to uniformly brown the crumbs. The bread crumbs had a particle size where about 35 percent by weight of the crumbs were retained on an 8 mesh U.S. Standard Screen after passing through a 5 mesh U.S. Standard Screen. About 57 percent by weight of the crumbs were retained on a 14 mesh U.S. Standard Screen. About 20 percent by weight of the crumbs were retained on a 20 mesh U.S. Standard Screen and about 8 percent by weight of the crumbs passed through a 20 mesh U.S. Standard Screen. The protein blend and seasoning blend were mixed together and then added to the bread crumbs in a rotating kettle. The protein and seasoning blends were applied to and adhered to the surface of the bread crumbs by spraying vegetable oil onto the mixture of crumbs, protein, and seasoning in the rotating kettle.

A 2½ pound (1.13 kg) chicken was cut up into pieces and the pieces were then dipped into water. Then each moistened chicken piece was completely covered with the bread crumb composition (about 120 grams of composition for the chicken pieces). The bread crumb composition was firmly pressed onto each piece.

The coated chicken pieces were then placed skin side down on a 10"×15" (254 mm×381 mm) baking pan which had ¼ cup (59 ml) of oil covering the pan surface. The coated chicken pieces were then baked for 25 minutes at 400° F. (204° C.), turned, and baked for an additional 25 minutes.

The method of the present invention was applied as follows: The bread crumbs and seasonings blend described above were mixed together thoroughly. A 2½ pound (1.13 kg) chicken was cut up into pieces which were washed in water then patted dry. The pieces were then dipped into the batter of Example I. The batter coated chicken pieces were rolled and pressed into the bread crumbs. The battered and breaded chicken pieces were then immersed in the egg white dip solution. After excess dip solution was allowed to drain off, the coated pieces were frozen.

After twenty-four hours of frozen storage, the coated chicken pieces were oven cooked under the conditions cited above in the prior art.

Additionally, chicken pieces prepared according to the specified prior art, and pieces coated by the method of the present invention were oven cooked under another set of conditions in which oil was not applied to the baking pan. Specifically, the pieces were placed in the baking pan, baked for 17 minutes at 450° F., then turned over, and baked for an additional 17 minutes, for a total of 34 minutes.

The resultant products were evaluated by the panel of experts described previously. Coated chicken pieces prepared according to the present invention and oven cooked at 400° F. in a pan to which oil had been added were found to closely resemble deep fried chicken in taste, texture, and appearance, which was characterized by a very crisp, uniform, continuous, cohesive, adhesive, and savory coating.

Pieces prepared and cooked according to the example of the prior art, although having some resemblance to deep fried chicken, were found to lack the uniform appearance, and the uniform, continuous, cohesive coating texture associated with deep fried foods. Additionally, the coating was crumbly and excessively greasy.

When the products of both the present invention and the prior art were cooked under higher temperature conditions, and in which no oil was added to the pan, the products of the present invention again were found to closely resemble deep fried chicken essentially as described above. Products of the prior art were found to be lacking both in uniform appearance and in uniform, continuous, cohesive texture associated with deep fried foods. Also, the prior art products were very dry, and lacked the sheen, savory mouthfeel and flavor normally imparted by the cooking oil to deep fried foods.

These results indicate that in addition to achieving deep fried food quality, the products of this invention had the ability to be reconstituted under a variety of conditions, and did not require the extra step of adding oil to the pan. This is because the oil which provides an essential contribution to the browning and crisping rate, appearance, texture, and mouth sensation is present as an integral part of the batter.

EXAMPLE III

The use of emulsion stabilizers other than spray dried egg whites in the batter of Example I was investigated in the following manner.

Frozen chicken nuggets were battered and breaded, dipped, frozen, and cooked as described in Example I, except that several trials were made in which the composition of the emulsion batter was varied by using alternative emulsion stabilizing agents.

The composition of the emulsion batters tried was as follows in Table C:

TABLE C

| No. | % Oil | % Water | Emulsion Stabilizer | % Emulsion Stabilizer |
| --- | --- | --- | --- | --- |
| 1 | 70.0 | 27.0 | Egg White Solids | 3.0 |
| 2 | 70.0 | 27.0 | Undenatured Whey[a] Protein Concentrate | 3.0 |
| 3 | 70.0 | 27.0 | Vital Wheat Gluten[b] | 3.0 |
| 4 | 70.0 | 27.0 | Wheat Protein Concentrate[c] | 3.0 |
| 5 | 70.0 | 28.8 | Pregelatinized Starch[d] | 1.2 |

[a]Alacen 886, New Zealand Milk Products, Petaluma, CA, 94952-1189.
[b]PROVIM, Henkel Corporation, Minneapolis, MN, 55435.
[c]Wheat Protein E-35, Henkel Corporation, Minneapolis, MN, 55435.
[d]Instant CLEAR GEL, National Starch and Chemical Co., Bridgewater, NJ, 08807.

The various batters were all found to have good resistance to oil and water phase separation (no significant separation within thirty minutes).

The resultant baked, coated chicken nuggets were judged by the panel of experts described previously. Nuggets coated using each of the above batter systems were found to have the taste, texture, and appearance of deep-fat fried foods. They were found to have a very crisp, uniform, continuous, and cohesive coating which remained crisp for several hours. The chicken of the coated pieces was found to be moist and tender. Further, it was noted that products with either a single or double coating of batter and breading has the taste, texture, and appearance of deep-fat fried foods.

These results indicate that emulsion stabilizing agents other than egg white solids can be used in the method of the present invention. The criteria of suitability of alternative emulsion stabilizing agents are essentially; (a) an ability to stabilize the emulsion for sufficient time and at appropriate viscosity for commercial coating equipment, and (b) either contributes positively to or does not detract from coating integrity.

EXAMPLE IV

The effect of variable levels of vegetable oil in the batter was also investigated.

Nine lots of individually quick frozen chicken nuggets were coated and cooked as described in Example I, except that the oil content of the emulsion batter was different for each lot. The composition of the emulsion batters is given in Table D. The oil level was varied from 0 to 100 percent, and the ratio of egg white solids was held constant at 9:1.

TABLE D

| Batter Number | % Oil | % Water | % Spray Dried Egg White |
| --- | --- | --- | --- |
| 1 | 100 | 0 | 0 |
| 2 | 90 | 9 | 1 |
| 3 | 70 | 27 | 3 |
| 4 | 60 | 36 | 4 |
| 5 | 50 | 45 | 5 |
| 6 | 40 | 54 | 6 |
| 7 | 30 | 63 | 7 |
| 8 | 20 | 72 | 8 |
| 9 | 0 | 90 | 10 |

All battered and breaded chicken nuggets were individually quick frozen. After twenty-four hours, all of the chicken nuggets were oven cooked by placing them on 9 inch circular pie baking pans, then placing the pans in an oven preheated to 450° F. The nuggets were baked for ten minutes, then turned over and baked for an additional ten minutes. The resultant baked coated chicken nuggets were judged by the panel of experts previously described.

Coated nuggets which had batters containing between thirty and seventy percent oil were found to be much like deep-fat fried foods in taste, texture, and appearance. The texture of these nuggets was found to be crisp, crunchy, continuous, and highly cohesive. Coated nuggets to which batters containing ninety percent oil or greater were applied, were found to lack the uniformly cohesive, continuous crisp coating associated with fried foods. Additionally, the ninety percent oil or greater batters were found to be excessively crumbly and oily. Coated nuggets to which batters containing twenty percent oil or less were applied, although showing a uniformly cohesive, continuous, and firm coating typical of the prior art breaded products, lacked the taste and crispness associated with deep-fat fried foods.

EXAMPLE V

The effect of varying the level of egg white solids in the dip solution of Example I was investigated.

Solutions of 0, 5, 7.5, and 15 percent by weight of egg white were prepared as described in Example I. Four lots of frozen chicken nuggets were battered and breaded as also described in Example I. The nuggets of each group were then immersed in its designated egg white dip. Excess dip or water was allowed to drain off and the coated nuggets were individually quick frozen. After twenty-four hours, all of the chicken nuggets were oven cooked by placing them on 9 inch circular baking pans, then placing the pans in an oven preheated to 450° F. The nuggets were baked for ten minutes, then turned over and baked for an additional ten minutes. The resultant baked, coated chicken nuggets were judged by the panel of experts described previously. Nuggets which were dipped in solutions of five percent or greater egg white solids were found to be much like deep fried foods in taste, texture, and appearance, with texture that was crisp, crunchy, continuous, and highly cohesive. Nuggets dipped in water instead of an egg white solution were found to be unlike deep-fat fried foods in appearance and were highly crumbly and lacked the crisp, continuous, cohesive texture associated with deep-fat fried foods.

EXAMPLE VI

The effect of extended frozen storage on the coating integrity and other qualities of products made by the method of the present invention were also investigated.

Individually quick frozen (IQF) cauliflower pieces 1 to 2 inches long and ¾ to 1½ inches in thickness were immersed in the batter of Example I, until completely covered. The batter coated pieces were then rolled and pressed into an American-style seasoned bread crumb which is commercially available (Griffith Laboratories, Inc., Scarsbourough Ontario, Canada, Product No. 1148). The battered and breaded cauliflower pieces were then immersed in the egg white dip prepared in Example I. Excess dip was allowed to run off, then the pieces were individually quick frozen, packaged in plastic bags (one pound per bag), then placed in frozen storage at 0° F. After four months, the pieces were removed from storage, placed in a baking pan, and cooked from the frozen state in an oven preheated to 450° F. for eight minutes. The pieces were then turned over and cooked for an additional eight minutes. The resultant products were examined by the panel of experts described previously and were found to be much like deep fried breaded cauliflower in taste, texture, and appearance, having a uniform, crisp, crunchy, continuous, and cohesive coating texture and a golden-brown color.

At the same time, additional cauliflower pieces which had been prepared as described above and frozen for the previous twenty-four hours were oven cooked in the same manner. The panel of experts described previously found that both the pieces stored frozen for four months and those frozen for twenty-four hours were much like deep-fat fried breaded cauliflower, and that there was little or no change in quality as a result of extended frozen storage.

These results indicate that the method of this invention is amenable to commercial practice in which long periods of frozen storage of products are necessary.

EXAMPLE VII

The chicken pieces coated both by the method of the present invention and by the prior art of U.S. Pat. No. 4,260,637, as described in Example II, were placed in separate 9×12×3 inch aluminum food trays, covered with aluminum foil, and frozen at 0° F. prior to oven cooking. The prior art product contained about 10 percent coating, the present invention product contained about 28 percent coating. After twenty-four hours the products were removed from the freezer and then were dropped in their containers to a table top from a height of three inches, twelve times.

The coating separation data were recorded in Table E:

TABLE E

| Example | Coating Loss in Drop Test (grams and % of the coating) |
| --- | --- |
| U.S. Pat. No. 4,260,637 | 10 grams (8.3%) |
| Method of Present Invention | <1 gram (<1%) |

Another set of both products was frozen for twenty-four hours, then cooked for a total of thirty-four minutes at 450° F. with no oil in the pans, also as described in Example II. The panel of experts previously described unanimously observed that bread crumb separation during cooking was negligible for products of the present invention. At the same time, it was estimated that about 8 to 15 grams of bread crumbs (7 to 13% of the coating) were deposited in the bottom of the pan when the prior art product was cooked.

These results indicate that products made by the method of the present invention are more amenable to the rigors of commercial handling than the prior art, in that the present invention product showed practically no separation of coating during freezing and subsequent rough handling and cooking. The prior art product showed significant coating separation due to both freezing and rough handling, and during cooking.

We claim:

1. A process for preparing breaded foods comprising applying a fat emulsion batter to a core comestible, thereafter breading the batter coated comestible, and thereafter overcoating the breaded comestible with an aqueous solution of egg white having at least about 5% egg white whereby food is oven bakeable while maintaining the characteristics of a fat fried food, said batter including from about 0.5% to about 15% based on the total weight of the emulsion of an emulsion stabilizer, and from about 30% to about 80% of a fat which is liquid at room temperature.

2. The process of claim 1 in which said fat constitutes from about 60% to about 70% of said emulsion.

3. The process of claim 1 in which said emulsion stabilizer is a member selected from the class consisting of proteinaceous and starchy substances.

4. The process of claim 1 in which said emulsion stabilizer is a member selected from the class of egg white solids, undenatured whey protein concentrate, undenatured lactalbumin, vital wheat gluten, wheat protein concentrate pregelatinized starches and combinations thereof.

5. The process of claim 4 in which said emulsion stabilizer is egg white solids present in an amount of from about 1% to about 10% of the total weight of the emulsion.

6. The process of claim 1 in which said fat is a vegetable oil.

7. The process of claim 6 in which said vegetable oil is a member selected from the class consisting of soybean oil, cottonseed oil, peanut oil, sunflower oil, safflower oil, corn oil and palm oil.

8. The process of claim 1 in which said comestible is a member selected from the class consisting of meat, poultry, seafood, fish, cheese, vegetables and fruit food items.

9. The process of claim 1 in which said core comestible is a member selected from the class consisting of chicken parts, meat and chicken patties, fish sticks and fillets, cheese cubes and sticks, mushroom pieces, onion rings, green pepper rings, zucchini slices and spears, cauliflower florets, and fruit pieces.

10. The process of claim 1 in which said core comestible prior to application of batter is a member selected from the class of a room temperature food, a frozen food and a refrigerated food.

11. The process of claim 1 in which the combined weight of the batter, breading and overcoating is from about 25% to about 65% of the total weight of the final breaded food.

12. The process of claim 11 in which said combined weight is from about 25% to about 40%, said core comestible having a single coating of batter and breading.

13. The process of claim 11 in which said combined weight is from about 50% to about 65%, said core comestible having a double coating of batter and breading prior to overcoating.

14. A process for preparing a breaded food comprising applying a batter to a core comestible, said batter including an emulsion of from about 30% to about 80% by weight of an oil which is a liquid at room temperature, from about 0.5% to about 15% of a proteinaceous or starchy emulsion stabilizer and the remainder water, applying breading to the batter coated comestible, and applying an overcoating of an aqueous solution of egg white having from about 5% to about 15% of egg white solids, the total coating on said core comestible being from about 25% to about 65% of the final food, said final food upon oven baking having the appearance, mouth-feel and physicomechanical properties of a fat fried breaded food.

15. The process of claim 14 in which the final product is frozen and packaged.

16. The process of claim 14 in which said oil is present in said emulsion in an amount of from about 60% to about 70%.

17. The process of claim 14 in which the final product is packaged and frozen.

* * * * *